United States Patent Office 3,499,009
Patented Mar. 3, 1970

3,499,009
POLYOLS OF METHYLENEDIANILINES
Alec Odinak, New Haven, Harold E. Reymore, Jr., Wallingford, and Adnan A. R. Sayigh, North Haven, Conn., assignors to The Upjohn Company, Kalamazoo, Mich., a corporation of Delaware
No Drawing. Continuation-in-part of application Ser. No. 334,600, Dec. 30, 1963. This application Sept. 27, 1965, Ser. No. 490,632
Int. Cl. C07c 91/16, 91/28
U.S. Cl. 260—570        8 Claims

ABSTRACT OF THE DISCLOSURE

Polyols, useful in preparing polyurethanes, are obtained by sequential alkoxylation of a polyamine firstly with 2 to 20 molar equivalents of ethylene oxide and secondly with 2 to 20 molar equivalents of a $C_{3-5}$ vicinal alkylene oxide. The starting polyamine is obtained by acid condensation of aniline and formaldehyde and preferably contains from 35 to 90 parts of methylenedianilines, the remainder being triamines and polyamines of higher functionality.

---

This invention relates to novel polyols, to a process for their preparation, and to their use in the preparation of novel polyurethanes and is more particularly concerned with novel polyols obtained by the sequential alkoxylation of amines of the methylenedianiline series and with processes for their preparation and with polyurethanes produced therefrom. This application is a continuation-in-part of application Ser. No. 334,600 filed Dec. 30, 1963 and now abandoned.

The polyols of the present invention are obtained by a process which comprises sequentially alkoxylating an amine of the methylenedianiline series with (a) ethylene oxide as the first alkoxylating agent and (b) a vicinal alkylene oxide having at least 3 carbon atoms, as the second alkoxylating agent, said ethylene oxide and said vicinal alkylene oxide having at least 3 carbon atoms, each being employed in an amount corresponding to at least one mole per reactive hydrogen atom originally present in said amine of the methylenedianiline series.

It has been suggested previously that polyols can be prepared by alkoxylation of active hydrogen containing compounds, i.e. compounds which give a positive reaction in the Zerewitinoff test as described in J. Am. Chem. Soc. 49, 3181, 1927. Active hydrogen containing compounds which have been alkoxylated in this manner include primary arylamines, alkanolamines, alcohols, glycols, alkyl glycosides, sorbitol, mannitol, glycerol and the like. It has also been suggested that the alkoxylation of materials of this type can be carried out using mixtures of two or more alkylene oxides either sequentially or in random manner; see, for example, U.S. Patents 2,626,911; 2,674,619, and 2,948,757, Canadian Patents 679,976, and 703,548, and British Patent 957,947.

It has not been suggested previously, however, that in preparing polyols by the alkoxylation of active hydrogen containing compounds using a mixture of two or more alkylene oxides, the order in which the alkylene oxides are employed in the alkoxylation plays a significant role in determining the properties of the resulting polyols. In particular it has not been suggested heretofore that, in the preparation of polyols by alkoxylation of amines of the methylenedianiline series using a mixture of two or more alkylene oxides, the order in which the various alkylene oxides are used in the alkoxylation plays a critical part in determining the physical properties of the polyols so obtained and also of polyurethanes derived from said polyols by reaction thereof with polyisocyanates according to procedures known in the art.

The present invention is based on the finding that the alkoxylation of an amine of the methylenedianiline series using ethylene oxide as the first alkoxylating agent followed by a vicinal alkylene oxide having at least 3 carbon atoms as the second alkoxylating agent, gives a polyol which has unexpectedly favourable viscosity characteristics when compared with the corresponding polyol obtained by using the alkoxylating agents in the reverse order. Further, the polyurethanes which are derived from the first named combination of polyols (ethylene oxide as the first alkoxylating agent) using procedures well-known in the art have unexpectedly superior fire retardant and structural strength properties when compared with the polyurethanes prepared from the corresponding polyols in which the order of alkoxylation is reversed.

The term "amine of the methylenedianiline series" is inclusive of methylenedianiline itself in its various isomeric forms, namely 4,4'-methylenedianiline, 2,4'-methylenedianiline and 2,2'-methylenedianiline as well as mixtures thereof, and is also inclusive of mixtures of polyamines containing methylenedianiline as a component thereof in amount from about 35% by weight to about 90% by weight of said mixture, which mixtures of polyamines are generally prepared by condensing aniline, or an aniline substituted by one or more inert substituents as hereinafter defined, and formaldehyde in the presence of a mineral acid, preferably hydrochloric acid, in accordance with procedures well-known in the art; see, for example, U.S. Patents 2,683,730 and 2,950,263. Such procedures generally give rise to a mixture of the corresponding methylenedianiline and the corresponding trimers, tetramers, and higher polymeric products. The main components of said mixtures can be represented by the following general formula:

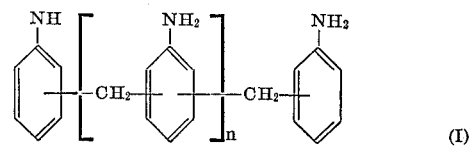

(I)

wherein $n$ is an integer from 0 to 4, inclusive; material wherein $n$ is higher than 4 may be present in minor amount (less than 5 percent) in said mixtures.

The phenyl nuclei in the compounds of Formula I can be substituted additionally by one or more substituents which are inert, i.e. do not enter into reaction under the alkoxylation conditions employed in the invention. Examples of such inert substituents are lower-alkyl, i.e. methyl, ethyl, propyl, butyl, pentyl, hexyl, and isomeric forms thereof; lower-alkoxy, i.e. methoxy, ethoxy, propoxy, butoxy, pentyloxy, hexyloxy, and isomeric forms thereof; halo; nitro; and cyano. Compounds of Formula I having one or more such inert substituents in the nucleus can be prepared readily by employing the appropriately substituted aniline in the condensation with formaldehyde. By carrying out the condensation using a mixture of two or more differently substituted anilines there is obtained a mixture of polyamines (I) wherein the substituents in the various rings are different; see, for example, U.S. Patent 3,097,191.

The proportion of dimer to trimer, tetramer and higher polymeric products in the mixture of polyamines (I) produced by condensing aniline or the appropriately substituted aniline with formaldehyde varies according to the nature of the substituents, if any, in the aniline and also the proportion of formaldehyde to aniline or substituted aniline employed in the condensation. For example, in the case of aniline itself the use of a molar ratio of aniline to formaldehyde as high as 4:1 gives polyamine mixtures containing as much as 85% by weight of the dimeric methylenedianiline; see, for example, U.S. Patent 2,950,-263. On the other hand, the use of a molar ratio of aniline to formaldehyde of the order of 4:2.5 gives a polyamine containing approximately 40% by weight of dimeric methylenedianiline, the remainder of said mixture being the corresponding trimer, tetramer, and higher polymers, the proportions of trimer to tetramer being approximately equal; see, for example, U.S. Patent 2,683,730. Varying proportions of the dimer, trimer, and tetramer and higher polymers can be obtained by varying the proportions of aniline to formaldehyde within the above ranges as will be readily appreciated by one skilled in the art.

The individual components of the mixtures of polyamines represented by the Formula I above can be separated, if desired, by procedures well-known in the art, for example, by chromatography, counter-current distribution, distillation, and the like. In general, the methylene groups in the compounds (I) bridge the para-positions with respect to the amino groups in the phenyl nuclei, provided said para positions are unsubstituted. Minor amounts of compounds (I) wherein the methylene group bridges an ortho-position (with respect to $NH_2$) in one phenyl nucleus and an ortho- or para-position in a second phenyl nucleus are formed in the condensation of the aniline and formaldehyde and these components can be isolated from the mixture of polyamines by the methods described above. The above remarks apply in the case where the aniline, employed as starting material in the condensation with formaldehyde, is unsubstituted in the para-position. Where the starting aniline is substituted in the para-position, the main product of Formula I will have methylene groups bridging the ortho positions. It will be apparent to one skilled in the art that the starting aniline, employed in preparing the polyamines (I) must be free of substitution in either the para position or one of the ortho positions.

In summary, the term "amine of the methylenedianiline series" is inclusive of (a) the mixtures of polyamines represented by the Formula I above including those wherein the phenyl nuclei are substituted by at least one inert substituent and (b) the individual components of said mixtures. The process of the invention can be applied to mixtures of compounds of Formula I or to individual components thereof.

In carrying out the process of the invention the amine of the methylenedianiline series is reacted firstly with ethylene oxide and the reaction product so obtained is reacted with a vicinal alkylene oxide having at least 3 carbon atoms. The term vicinal alkylene oxide having at least 3 carbon atoms means an alkylene oxide having the formula

(II)

wherein $R_1$ represents lower-alkyl as hereinbefore defined and $R_2$ is selected from the class consisting of hydrogen and lower-alkyl as hereinbefore defined. Examples of vicinal alkylene oxides having at least 3 carbon atoms are 1,2-propylene oxide, 1,2-butylene oxide, 1,2-heptylene oxide, 3,4-octylene oxide, 2,3-nonylene oxide, and the like.

In carrying out the first alkoxylation step of the process of the invention the amine of the methylenedianiline series is reacted with from about 2 to about 20 molecular equivalents of ethylene oxide for each amine equivalent. By the term, amine equivalent, is meant as many weight units as there are units in the equivalent weight of the amine of the methylenedianiline series. In the case of methylenedianiline itself the amine equivalent corresponds to the equivalent weight. The equivalent weight of a polyamine or a mixture of polyamines is determined by measuring the amount of polyamine required to neutralize one molecular equivalent of an acid, for example, 36.5 g. of hydrochloric acid. If 105 grams of polyamine mixture is required to neutralize 36.5 grams of hydrochloric acid, the equivalent weight of the polyamine mixture would then be 105 grams or 105 pounds or 105 kilograms depending on the weight units chosen. A molecular equivalent of ethylene or the higher alkylene oxide would be as many of the same weight units, i.e. grams, pounds, or kilograms, as there are units in the molecular weight of the alkylene oxide.

The reaction between ethylene oxide and the amine of the methylenedianiline series is carried out in the range of about 150° C. to about 220° C. at atmospheric pressure. i.e. in an open reaction vessel, or at superatmospheric pressure. i.e. in an autoclave or similar closed vessel. At atmospheric pressure it is usually preferred to maintain the reaction mixture at the desired temperature and to pass the ethylene oxide below the surface of the reaction mixture at about the rate at which the oxide is consumed. At superatmospheric pressure the alkylene oxide is advantageously added, either continuously or intermittently, at such a rate that the reaction temperature and pressure can be maintained at the desired levels.

It has been found the reaction of the ethylene oxide and the amine of the methylenedianiline series proceeds readily without a catalyst until the amount of ethylene oxide consumed corresponds to 2 molecular equivalents per amine equivalent of amine. At this point each of the free hydrogens on the amino moieties of the amine has been replaced by a 2-hydroxyethyl group. Theoretically when the stage has been reached at which one of the two hydrogen atoms on a primary amino group of the amine has been replaced by 2-hydroxyethyl, the second equivalent of ethylene oxide can attack either the remaining N–H bond on the amino group or the O–H linkage of the 2-hydroxyethyl group. The reactivity of the N–H linkage is however significantly higher than that of the O–H linkage so that the second equivalent of ethylene oxide attacks the N–H linkage preferentially.

If, however, it is desired to introduce further ethylene oxide into the reaction product obtained above it is found that the use of an alkoxylation catalyst is necessary. The less reactive O–H linkage in the 2-hydroxyethyl groups is now the point of attack. This further ethoxylation to produce an alkoxylation product containing in excess of 2-molecular equivalents of ethylene oxide per amine equivalent of amine of the methylenedianiline series, is advantageously carried out in the range of about 125° C. to about 250° C. at atmospheric or superatmospheric pressure (of the order of about 20 to about 60 p.s.i.g. is a preferred range of reaction pressure) in the presence of an alkoxylation catalyst. Any alkoxylation catalyst known in the art can be employed for this purpose. Examples of such catalyst are alkali metals such as sodium, potassium, and lithium and alkali metal hydroxides such as sodium hydroxide, potassium hydroxide, lithium hydroxide, and the like.

If desired, the catalyst can be present throughout the initial stages of the reaction between the ethylene oxide and the amine of the methylenedianiline series but advantageously said catalyst is not added until the initial stage of the reaction, namely the addition of two molecular equivalents of ethylene oxide per amine equivalent, has been completed. The catalyst can be added to the reaction mixture either initially or at the above intermediate stage, in solid form or in solution or suspension.

The amount of alkoxylation catalyst employed in the above process is generally within the range of about 0.0001 to about 1 part by weight of catalyst per 100 parts by weight of amine of the methylenedianiline series.

Although a reaction diluent is usually not necessary in carrying out the above ethoxylations, an inert liquid diluent can be present in the reaction mixture, if desired, to aid in the dispersion of the alkylene oxide in the amine mixture. Examples of suitable diluents are monochlorobenzene, N,N,-dimethylformamide, toluene, xylene, and the like.

The reaction product of ethylene oxide and the amine of the methylenedianiline series obtained as described above can be purified, if desired, but is preferably employed, without further treatment, in the second alkoxylation step of the invention. If purification of the ethylene oxide reaction product is desired before use of the product in the second alkoxylation said purification can be effected using procedures known in the art. For example, the excess of ethylene oxide, if any is present, can be removed by entrainment in a stream of inert gas such as nitrogen, argon, xenon, and the like; if an inert organic solvent has been employed as reaction solvent this can be removed by distillation under reduced pressure and the residue from such treatment or treatments can be purified by chromatography, counter-current distribution and the like. Where the reaction product is a mixture of two or more ethoxylated components said components can be separated by these various means and employed separately or collectively in the second alkoxylation step of the process of the invention.

The second alkoxylation step of the process of the invention, in which the ethoxylated product from the first stage above is reacted with a vicinal alkylene oxide containing at least 3 carbon atoms, is carried out advantageously using the reaction conditions and procedures described above for the reaction of ethylene oxide in an amount in excess of that required to replace each of the active hydrogen atoms attached to the amino nitrogen atoms of the starting material. Thus, the reaction is conducted advantageously at a temperature in the range of about 125° C. to about 250° C. at atmospheric or superatmospheric pressure in the presence of an alkoxylation catalyst. Preferably the catalyst employed is the same as that employed in the first stage of the process of the invention, if that stage has been conducted in the presence of a catalyst. Where an alkoxylation catalyst has been employed in the ethoxylation stage of the process of the invention, the reaction product from the first stage can be employed, without further treatment, in the second stage and no further addition of catalyst is generally necessary.

When an alkoxylation catalyst is employed in the second alkoxylation stage of the process of the invention said catalyst is employed in an amount within the range set forth above for the ethoxylation stage (first stage) of the process.

The amount of vicinal alkylene oxide (II) employed in this second alkoxylation step is generally from about 2 to about 20 molecular equivalents of alkylene oxide for each amine equivalent, as defined above, of amine of the methylenedianiline series employed as starting material in the first step of the process of the invention.

When the vicinal alkylene oxide (II) is unsymmetrical, i.e. the groups $R_1$ and $R_2$ are not identical, it will be seen from the following reaction schemes that the addition of the alkylene oxide (II) across the O–H bond of a hydroxyethyl group in the reaction product from the first step of the reaction, can occur in two possible ways giving rise to a mixture of products.

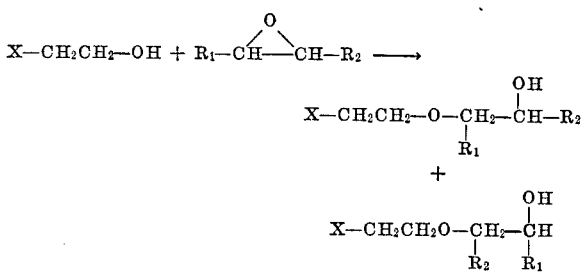

In the above equation X represents the residue of the reaction product obtained in the first step of the process of the invention and $R_1$ and $R_2$ have the significance hereinbefore defined. The above equation typifies the reaction that will occur in respect of each of the plurality of hydroxyethyl substituents present in the reaction from the first step of the process of the invention. When the alkylene oxide (II) is employed in an excess over that required to alkoxylate each of the hydroxyethyl groups in the starting material, further reaction of the alkylene oxide with the products shown in the above equation will occur with analogous results.

Where $R_2$ in the alkylene oxide (II) represents hydrogen it will be seen that one of the possible reaction products shown in the above equation will contain a secondary hydroxyl group while the other product will have a terminal primary hydroxy group. In general, it has been found that the reaction product having the secondary hydroxyl group is the predominate isomer although the product usually contains at least a minor amount e.g. about 10 percent, of the primary hydroxy configuration.

The products obtained in the second alkoxylation stage of the invention can be isolated and purified, if desired, by known procedures. For example, any excess of alkylene oxide (II) can be removed by purging the reaction mixture with an inert gas such as nitrogen, argon, xenon, and the like. If an inert organic solvent has been used as reaction solvent this can be removed by distillation under reduced pressure. The sequentially alkoxylated product so obtained can be purified, or in the case of a mixture, can be separated into its individual components, if desired, by conventional purification and separation techniques such as chromatography, counter-current distribution, fractional distillation and the like, or any combination of these techniques.

The sequentially alkoxylated products of the invention, hereinafter referred to as the polyols of the invention, are novel materials which can be represented by the following general formula:

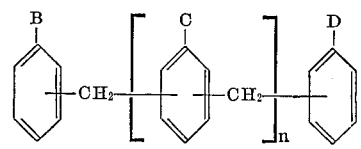

wherein B, C, and D represent:

$-N-[(CH_2CH_2O)_x-(A-O)_y-H]_2$
$-N-[(CH_2CH_2O)_{x'}-(A-O)_{y'}-H]_2$
$-N-[(CH_2CH_2O)_{x''}-(A-O)_{y''}-H]_2$ respectively, wherein A is the residue of the alkylene chain of the alkylene oxide (II), $n$ is an integer from 0 to 4, inclusive, and $x$, $y$, $x'$, $y'$, $x''$ and $y''$ are each integers from 1 to 10, inclusive.

The compounds embraced by the Formula III are clearly distinguished in properties from the corresponding compounds, many of which are known in the art, in which the alkoxylation has been carried out using a single alkylene oxide or using a mixture of alkylene oxides such that the resulting products contain a random arrangement of alkylene oxide residues in the hydroxy-polyalkoxy chains. Examples of such known alkoxylated amines of the methylenedianiline series wherein a single alkylene oxide or a random mixture of alkylene oxides is employed as alkoxylating agent, are those disclosed in German Auslegeschrift 1,151,938 and German Patent 1,147,033.

Thus, the compounds of Formula III show more favourable viscosity characteristics than the corresponding compounds in which the alkoxylation steps have been reversed, i.e. alkoxylation using an alkylene oxide (II) is carried out as a first step and ethoxylation is carried out as the second step. For example the product obtained according to the process of the invention using as starting amine a mixture of polyamines containing approximately 50% by weight of methylenedianiline the remainder of said mixture being composed of approximately equal parts of trimer, tetramer, and high polyamines, and employing 2 molar equivalent of ethylene oxide for each amine equivalent of starting material in the first stage and a corersponding amount of propylene oxide in the second stage, has a viscosity of approximately 10,000 centipoises at 50° C. In contrast the corresponding compound obtained by using the same starting material but reversing the order in which the ethylene oxide and propylene oxide are used has a viscosity of approximately 20,000 centipoises.

This marked difference in viscosity renders the former material much easier to handle than the latter material as a component of a reaction mixture for the preparation of polyurethanes by reaction of said polyols with polyisocyanates in the presence of appropriate catalysts and other adjuvants in accordance with procedures known in the art.

A further characteristic of the polyols of the invention is that these compounds are more readily compatible with the other components of polyurethane reaction mixtures than are the analogous polyols of the prior art. Illustratively the polyol of the invention prepared as above from a mixture of polyamines containing approximately 50% methylene dianiline, is readily compatible with the polyisocyanates, catalyst, surfactants, and other additives commonly employed in the preparation of cellular polyurethanes and yields polyurethane foams having useful properties whereas the corresponding polyol obtained by alkoxylating the aforesaid polyamine mixture with ethylene oxide alone is not readily compatible with the polyurethane forming components and does not readily give rise to useful foams.

A yet further distinction between the polyols of the invention and those compounds prepared in an analogous manner using a single alkylene oxide or a mixture of 2 or more alkylene oxides in random order is to be found in the structural stability, particularly on exposure to heat, of polyurethane foams prepared from these various polyols using conventional procedures discussed in more detail below. Thus, comparison of the properties of rigid polyurethane foams prepared under identical conditions from polyisocyanates in the presence of catalysts, blowing agents and the like, using (a) polyols of the invention and (b) analogous compounds in which the sequence of ethylene oxide and the second alkylene oxide (II) is reversed and also analogous compounds in which a single alkylene oxide is used, shows that the foams prepared from the polyols of the invention do not melt upon exposure to high temperatures but form a char of high structural integrity. In contrast the foams prepared from the analogous polyols of the prior art soften and melt when exposed to the same test conditions. This superiority of structural stability imparted to rigid foams prepared from polyols of the invention is of considerable importance in the use of these materials as thermal barriers.

Accordingly, the novel polyols (III) of the invention are useful as intermediates in the preparation of polyurethanes in accordance with procedures known in the art and are distinguished from polyols hitherto prepared by their superior properties in relation to viscosity and compatibility in such use, and by the improved properties imparted to the resulting polyurethanes.

In preparing polyurethanes from the polyols of the invention the procedures well-known in the art for the preparation of such materials are employed, the polyols of the invention being used to replace a part or the whole of the polyol components employed in the art procedures. While the polyols of the invention can be applied to the formation of any type of polyurethane, including cellular and non-cellular polyurethanes, they are of particular application in the preparation of cellular polyurethane products. Accordingly the use of the polyols of the invention in the preparation of polyurethanes will be illustrated by reference to the preparation of cellular products but it is to be understood that the invention is not limited thereto but is of general application to the preparation of polyurethanes of all types.

The various methods for the preparation of polyurethane foams are well known in the art and do not require detailed discussion; see, for example, Dombrow, "Polyurethanes," Reinhold Publishing Corp., New York, pp. 1–105 (1957); Saunders et al. "Polyurethanes," part I, Interscience Publishers, New York (1962).

One of the commonest procedures consists in reacting a polyol, for example, a polyester or polyether, with an organic polyisocyanate and with water, if necessary in the presence of catalysts, surface active agents or other auxiliary agents, whereby simultaneous interaction between the isocyanate, water and the polyol occurs to give the required foam product. This is the so-called "one-shot" procedure. Alternatively the polyol may be reacted with sufficient polyisocyanate to give an intermediate reaction product containing free isocyanate groups and this product, known as prepolymer, may then be reacted with water, if desired in the presence of catalyst, surface active agents or other auxiliary agents, in order to produce the final foamed product. This latter is the so-called "prepolymer" process. Many variations in the method of carrying out these basic processes are known.

Any of the prior art polyisocyanates conventionally used in the preparation of rigid polyurethane foams can be employed in the process of the present invention. Illustrative of such isocyanates are 2,4-tolylene diisocyanate, 2,6-tolylene diisocyanate, 4,4'-diphenylmethane diisocyanate, dianisidine diisocyanate, tolidine diisocyanate, hexamethylene diisocyanate, m-xylylene diisocyanate, 1,5-naphthalene diisocyanate, and other di- and higher polyisocyanates such as those listed in the tables of Siefken, Ann. 562, 122–135 (1949). Mixtures of two or more of the above isocyanates can be used if desired. Preferred polyisocyanates are products obtained by phosgenation of mixtures of methylene-bridged polyphenyl polyamines obtained by the interaction of formaldehyde, hydrochloric acid, and primary aromatic amines, for example, aniline, o-chloroaniline, o-toluidine, or mixtures thereof. Such polyisocyanates are known in the art, e.g., U.S. 2,683,730; 2,950,263; and 3,012,008; Canadian Patent No. 665,495; and German Patent 1,131,877. A particularly preferred polyisocyanate of this type is the polymethylene polyphenyl isocyanate available commercially under the trademark PAPI®.

While the polyols of the invention having the Formula III are preferably employed as the sole polyol in preparing polyurethane foams in accordance with this invention, they can, if desired, be employed in combination with other polyols conventionally employed in the procedures used in the art. Preferably, the polyols of the invention form the major part of any combination with prior art polyols, i.e. are present in said combination in amount greater than 50% by weight of the combination, in order that the resulting polyurethanes exhibit the advantages in properties discussed above.

The polyols conventionally used in the art, which can be used in combination with the polyols of the invention as discussed above, have a hydroxyl number within the range of approximately 180 to approximately 800. The polyols normally used for the preparation of rigid foams are those having a hydroxyl number in the range of approximately 300 to approximately 800.

Illustrative polyols which can be used in the process of the invention are polyethers such as polyoxyalkylene glycols such as the polyoxyethylene glycols prepared by the addition of ethylene oxide to water, ethylene glycol or diethylene glycol; polyoxypropylene glycols, prepared by the addition of 1,2-propylene oxide to water, propylene glycol or dipropylene glycol; mixed oxyethyleneoxypropylene polyglycols prepared in a similar manner utilizing a mixture of ethylene oxide and propylene oxide or a sequential addition of ethylene oxide and 1,2-propylene oxide; polyether glycols prepared by reacting ethylene oxide, propylene oxide or mixtures thereof with mono- and polynuclear dihydroxy benzenes, e.g. catechol, resorcinol, hydroquinone, orcinol, 2,2-bis(p-hydroxyphenyl) propane, bis(p-hydroxyphenyl) methane, and the like; polyethers prepared by reacting ethylene oxide, propylene oxide, or mixtures thereof with aliphatic polyols such as glycerol, sorbitol, trimethylolpropane, 1,2,6-hexanetriol, pentaerythritol, sucrose or glycosides, e.g. methyl, ethyl, propyl, butyl, and 2-ethylhexyl, arabinoside, xyloside, fructoside, glucoside, rhamnoside, etc.; polyethers prepared by reacting ethylene oxide, propylene oxide or mixtures thereof with alicyclic polyols such as tetramethylolcyclohexanol; polyols containing a heterocyclic nucleus such as 3,3,5-tris(hydroxymethyl) - 5 - methyl-4 - hydroxytetrahydropyran and 3,3,5,5-tetrakis(hydroxymethyl)-4-hydroxytetrahydropyran; or polyols containing an aromatic nucleus such as 2,2-bis-(hydroxyphenyl)ethanol, pyrogallol, phloroglucinol, tris(hydroxyphenyl)alkanes, e.g., 1,1,3-tris(hydroxyphenyl)ethanes, and 1,1,3-tris(hydroxyphenyl)propanes, etc. tetrakis(hydroxyphenyl)alkanes, e.g. 1,1,3 - tris(hydroxyphenyl)ethanes, and 1,1,3 - tris(hydroxyphenyl)propanes, etc., tetrakis(hydroxyphenyl)alkanes, e.g., 1,1,3,3 - tetrakis(hydroxy-3-methylphenyl)propanes, 1,1,4,4-tetrakis(hydroxyphenyl)-butanes, and the like.

A particularly useful polyol for employment in the process of the invention is a polyol mixture comprising a polyol adduct produced by mixing under hydroxyalkylation conditions from 2 to 20 molecular equivalents of ethylene oxide, propylene oxide, or 1,2-butylene oxide, or mixtures thereof, and one amine equivalent of a polyamine mixture, 100 parts of said polyamine mixture containing from 35 to 90 parts of methylenedianilines, the remaining parts being triamines and polyamines of higher molecular weight, said methylenedianilines, triamines and polyamines of higher molecular weight having been formed by acid condensation of aniline and formaldehyde.

Illustrative of the polyester polyols which can be employed in the process of the invention are those prepared from dibasic carboxylic acids and polyhydric alcohols, preferably trihydric alcohols. The dibasic carboxylic acids useful in preparing the polyesters have no functional groups containing active hydrogen atoms other than their carboxylic acid groups. They are preferably saturated. Acids such as phthalic acid, terephthalic acid, isophthalic acid, succinic acid, glutaric acid, adipic acid, and pimelic acid are suitable. Anhydrides of these acids may be used also. The polyol component or components of the polyester are preferably trihydric. Examples of suitable polyols include trimethylolethane, trimethylolpropane, mannitol, hexanetriol, glycerine and pentaerythritol. Small amounts of dihydric alcohols such as ethylene glycol, diethylene glycol 1,2-propylene glycol, 1,4-butanediol, and cyclohexanediol may also be used. In preparing rigid polyurethane foams it is recommended that no more than about 20% of the hydroxyl groups of the polyester used be supplied by a diol. The above polyesters are typical of those which can be employed in the one-shot, but preferably in the prepolymer, methods of foaming using the process of the invention.

In making rigid foams in accordance with the process of the invention it is advantageous to add a hydroxyl terminated cross-linking polyol to the reaction mixture to form the best network for foam formation. Advantageously the crosslinking polyol should have at least 3 hydroxy groups in the molecule and can be added to the foam reaction mix at any point at which the other polyols are added. Examples of such crosslinking polyols are trimethylolpropane, glycerol, 1,2,6 - hexanetriol, pentaerythritol, hydroxyalkylated aliphatic diames such as N,N,N',N' - tetrakis(2 - hydroxypropyl)ethylenediamine, N,N,N',N' - tetrakis(2 - hydroxyethyl)ethylenediamine, and the like, and alkylene oxide reaction products of sugars such as sucrose, and the like.

In preparing polyurethane foams according to the invention, it is desirable, in accordance with conventional procedures, to employ a catalyst in the reaction of the polyisocyanate and polyol. Any of the catalysts conventionally employed in the art to catalyze the reaction of an isocyanate with reactive hydrogen containing compound can be employed for this purpose; see, for example, Saunders et al., Ibid, volume I, pp. 228–232; see, also Britain et al. "J. Applied Polymer Science," 4, 207–211, 1960. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. The preferred catalysts for use in the process and compositions of the invention are the tertiary organic amines of which the following are representative: triethylamine, triethylenediamine, N,N,N',N' - tetramethylethylenediamine, N,N,N',N' - tetraethylethylene diamine, N-methylmorpholine, N-ethylmorpholine, N,N,N',N'-tetramethylguanidine, N,N,N',N' - tetramethyl - 1,3 - butanediamine, N,N - dimethylethanolamine, N,N - diethylethanolamine, and the like, or mixtures of two or more such amines. The amount of catalyst employed is generally within the range of about 0.1 to about 2.0% by weight based on total weight of reactants in the polyurethane forming reaction mixture.

The ratio of isocyanate groups to active hydrogen containing groups in the foam mixtures of the invention is within the normal limits employed in the production of polyurethane foams. Thus said ratio is advantageously within the range of from 1.50 to 0.65:1 and preferably within the range of 1.20:1 to 1:1, whether the isocyanate and polyol are employed separately in the one-shot process or whether the two components have been reacted to form a prepolymer. The lower ranges of isocyanate to active hydrogen group ratio are used where the polyol is highly functional.

The final foam density of the products produced by the process of the invention can be controlled in accordance with methods well known in the art. For example, this control can be accomplished by regulating the amount of water present in the foam mixture or by using a combination of water and a conventional blowing agent having a boiling point below about 110° C. and preferably below about 50° C. such as a volatile aliphatic hydrocarbon or a volatile highly halogenated hydrocarbon, for example trichloromonofluoromethane, dichlorodifluoromethane, chlorotrifluoromethane, 1,1-dichloro - 1 - fluoroethane, 1-chloro-1-, 1-difluoro-2, 2-dichloroethane and 1,1,1-trifluoro-2-chloro-2-fluorobutane or mixtures thereof.

Optional additives such as dispersing agents, cell stabilizers, surfactants, flame retardants, and the like which are commonly employed in the fabrication of rigid polyurethane foams, can be employed in the process of the invention. Thus a finer cell structure may be obtained if water-soluble organosilicone polymers are used as surfactants. Organosilicone polymers obtained by condensing a polyalkoxy polysilane with the monoether of a polyalkyleneether glycol in the presence of an acid catalyst are representative of those surfactants which can be used for this purpose. The organosilicone copolymer available under the trade name L5320 is typical of such polymers. Other surfactants such as ethylene oxide modified sorbitan monopalmitate or ethylene oxide modified polypropyleneether glycol may be used, if desired, to obtain better dispersion of the components of the foam mixture.

Other additives such as dyes, pigments, soaps and metallic powders and other inert fillers may be added to the foam mixture to obtain special foam properties in accordance with practices well-known in the art.

In a particular embodiment of that part of the present invention which relates to the preparation of polyurethane foams we have found that polyurethane rigid foams, having outstanding fire retardant properties and possessing high structural stability on prolonged exposure to high temperatures, are obtained by using as the polyol in the above described process a mixture which has the following composition. Said polyol mixture comprises (1) a mixture of polyols represented by the Formula III wherein $x$, $y$, $x'$, $y'$, $x''$ and $y''$ each have an average value of about 1.0, A is a propylene residue and $n$ has an average value of at least 1 and (2) a polyol containing at least one element selected from the class consisting of phosphorus, chlorine, and bromine.

The proportions of the components (1) and (2) in said mixture are so chosen that the average functionality of said mixture is at least 4.0 and is preferably within the range of about 4.0 to about 8.0. Since the average functionality of the most commonly available members of the class of components (2) is from 2.0 to 3.0 this means that the average functionality of the component (1) must be correspondingly higher, of the order of at least 6.0 [the polyols of Formula III wherein $n$ is an average of 1.0 have a functionality of 6.0] in order that the mixture of components (1) and components (2) can contain approximately equal parts by weight.

In the preparing fire retardant polyurethane rigid foams according to this aspect of the invention, a polyisocyanate such as those set forth above, preferably one having a functionality higher than 2.0 is reacted with the above-described polyol mixture using the procedures described above. Preferably the amount of polyol mixture employed, and the proportions of components therein, is so chosen that the amount of the element, selected from the class consisting of phosphorus, chlorine, and bromine, derived from polyol component (2) present in the final form is of the order of about 0.75% to 1.5% by weight in the case of phosphorus and from about 2% to about 12% by weight in the case of chlorine and/or bromine.

A particularly useful class of polyisocyanates which can be employed in the preparation of the above group of fire retardant rigid foams are those derived by phosgenation of mixtures of methylene-bridged polyphenyl polyamines as described in more detail above, especially those polymethylene polyphenyl polyisocyanates prepared in this way which contain from about 45% to about 60% by weight of methylene bis(phenyl isocyanate) the remainder of said mixture being trimers, tetramers, and like polymeric materials or higher functionality.

The polyols which form component (2) of the above-described mixture of polyols are a class of polyols well-known in the art which are conventionally employed in preparing fire retardant polyurethane foams.

Representative polyols of this class are:

Dialkyl N,N-di(hydroxyalkyl)aminomethanephosphonates of which diethyl N,N-di(2-hydroxyethyl)aminomethanephosphonate (Fyrol 6) is typical;
Alkylene oxide-prosphoric acid adducts such as those described in U.S. Patent 2,372,244;
Dihaloalkenediols such as dibromobutenediol;
The phosphorus containing polyols available commercially under the trade names Vircol 82 and Vircol 638 which are believed to be alkylene oxide adducts of dialkylpyrophosphates;
The chlorine containing polyol available commercially under the trade name Thanol R-350-X of which the structure has not been disclosed by the manufacturer;
The polyester polyols derived from chlorendic anhydride which are available under the generic name Hetrons.

The polyurethanes prepared in accordance with the processes of the invention are useful for the purposes for which polyurethanes are conventionally employed. For example, the rigid and semi-rigid polyurethane foams produced according to the invention are useful for insulating purposes, either as slab stock or in preformed building panels, and, because of their ability to hold lubricants and to resist torque, as transmission plates in power transmission systems using fluids, and in similar systems. The flexible foams produced according to the invention are useful for a variety of cushioning, upholstery, and like uses. The elastomeric polyurethanes produced in accordance with the invention find application in the preparation of gaskets, sealants, flexible tubing, and the like.

The following examples describe the manner and process of making and using the invention and set forth the best mode contemplated by the inventors of carrying out the invention but are not to be construed as limiting.

EXAMPLE 1

The amine of the methylenedianiline series employed as starting material in the process described below was a mixture of polyamines containing approximately 50% by weight of methylenedianiline, the remainder of said mixture being approximately equal proportions of the corresponding trimer, tetramer and higher polymers, said mixture having been prepared by condensing aniline and formaldehyde in the molar proportions of approximately 4:2.26 in the presence of hydrochloric acid following the procedure of U.S. Patent 2,683,730. Said mixture of polyamines had an average amine equivalent weight of 103 and an average functionality of 5.0.

A total of 412 g. (4 amine equivalents) of the above polyamine mixture was stirred under an atmosphere of nitrogen in the absence of catalyst at a temperature in the range of 170° to 200° C. while ethylene oxide (352.8 g.; 8 moles) was bubbled beneath the surface of the mixture over a period of 3.5 hrs.

Potassium hydroxide (0.52 g.) was then added and the mixture was reacted with propylene oxide (458.2 g.; 7.9 moles) during about 9 hrs. in the range of 200° to 240° C. The resulting polyamine-ethylene oxide-propylene oxide polyol adduct (1223 g.) had a hydroxyl number 400; viscosity 10,750 cps. at 50° C.

For purposes of comparison the above procedure was repeated but the order of alkylene oxide addition was reversed. The procedure was as follows: The same starting polyamine mixture (412 g.; 4.0 amine equivalents) was reacted in the absence of catalyst with propylene oxide (456 g.; 7.85 mole) during 10 hours in the range 200° C. to 230° C. Potassium hydroxide (0.52 g.) was then added and the mixture was heated in the presence of ethylene oxide in the range 170° C. to 200° C. for 45 minutes. Because the absorption of ethylene oxide was slow at first, additional potassium hydroxide (0.52 g.) was added and the temperature was raised to the range 200° to 225° C. after which the ethylene oxide (356 g.; 8.1 mole) was absorbed during about 4 hours. The resulting polyamine-propylene oxide-ethylene oxide polyol adduct had a hydroxyl number 358; viscosity 20,400 cps. at 50° C.

EXAMPLE 2

Using the procedure of Example 1, but replacing the mixture of polyamines employed as starting material by 4,4'-methylenedianiline there was obtained a tetrafunctional polyol consisting predominantly of N,N,N',N'-tetra[2 - (2 - hydroxypropyloxy) - ethyl] - 4,4' - methylenedianiline containing minor amounts of N,N,N',N'-tetra[2 - (3 - hydroxypropyloxy)ethyl] - 4,4' - methylenedianiline.

EXAMPLE 3

Using the procedure described in Example 1, but replacing propylene oxide employed in the second alkoxylation step by 1,2-butylene oxide, there is obtained the corresponding polyamine-ethylene oxide-1,2-butylene oxide adduct.

Similarly, using the procedure described in Example 1, but replacing propylene oxide employed in the second alkoxylation step by 1,2-hexylene oxide and 2,3-hexylene oxide, there are obtained the corresponding polyamine-ethylene oxide-1,2-hexylene oxide and polyamine-ethylene oxide-2,3-hexylene oxide, respectively.

EXAMPLE 4

A total of 412 g. (4 amine equivalents) of the polyamine mixture employed as starting material in Example 1 is reacted with ethylene oxide (352.8 g.; 8 moles) in the absence of catalyst using the reaction conditions described in the first alkoxylation step of Example 1. The reaction product is then transferred to a 1 gal. stainless steel autoclave. Crushed solid potassium hydroxide (1 g.) is added to said reaction product and, after displacing the air in said autoclave with nitrogen, the contents of the autoclave are heated to about 135° C. with agitation. A total of 1,020 g. (17.6 moles) of propylene oxide is then pumped in at such a rate as to maintain the pressure in the autoclave at 30 to 60 p.s.i.g. The temperature of the reaction mixture is maintained at about 135° C. by occasional cooling. The autoclave is then purged with nitrogen, cooled and the contents of the autoclave are removed. There is thus obtained the corresponding polyamine-ethylene oxide-propylene oxide adduct wherein the proportion of equivalents of ethylene oxide to starting amine is approximately 1:1 and the molar proportion of ethylene oxide to propylene oxide is approximately 1:2.2.

EXAMPLE 5

Using the procedure described in the first alkoxylation step of Example 1, 412 g. (4 amine equivalents) of the polyamine mixture employed as the starting material in Example 1, was reacted in the absence of catalyst with ethylene oxide (367.4 g.; 8.35 moles) during 3 hrs. in the range of 165 to 205° C. To the resulting mixture was added crushed potassium hydroxide (0.52 g.) and the mixture was reacted with additional ethylene oxide (340.3 g.; 7.75 moles) during 3 hours in the range of 170 to 200° C. The resulting mixture was then treated with a further 0.52 g. of crushed potassium hydroxide and reacted with propylene oxide (456 g.; 7.85 moles) during about 9 hrs. in the range of 200° C. to 240° C. using the procedure described in the second alkoxylation step of Example 1. There was obtained the corresponding polyamine- ethylene oxide-propylene oxide adduct wherein the proportion of equivalents of ethylene oxide to starting amine is approximately 1:2 and the molar proportion of ethylene oxide to propylene oxide is approximately 2:1.

EXAMPLE 6

Using the procedure described in Example 1, but replacing the polyamine mixture employed therein as starting material by an equivalent amount of a mixture of polyamines containing approximately 70% by weight of methylenedianilines, the remainder of said mixture being approximately equal proportions of the corresponding triamine, tetramine and higher polyamines, said mixture having been obtained by condensing aniline and formaldehyde in the molar proportions of about 4.0 to about 1.6 in the presence of hydrochloric acid, there is obtained the corresponding polyamine-ethylene oxide-propylene oxide adduct the proportions of equivalents of ethylene oxide to starting amine being approximately 1:1 and the molar proportions of ethylene oxide to propylene oxide being approximately 1:1.

EXAMPLE 7

This example illustrates the preparation of a fire retardant rigid polyurethane foam according to the invention.

A mixture of 70 g. of the polyamine-ethylene oxide-propylene oxide adduct prepared as described in Example 1, 30 g. of a propylene oxide-phosphoric acid adduct (prepared in accordance with the procedure described in U.S. Patent 2,372,244), 2 g. of DC–201 (an organosilicone copolymer surfactant), 0.5 g. of N,N,N',N'-tetramethyl-1,3-butanediamine, and 0.5 g. of triethylamine was prepared using a mechanical blender. Freon 11-B (modified trichlorofluoromethane) was introduced into the mixture until an overall weight increase of 33 g. was attained. To the resulting mixture was added 101 g. (0.76 equiv.) of PAPI® (polymethylene polyphenyl polyisocyanate; equivalent weight 133) with vigorous stirring, and the mixture so obtained was poured as quickly as possible into an open mold (7″ x 7″ x 12″) and allowed to rise freely. The resulting foam was cured at approximately 25° C. for 24 hrs. The physical properties of the foam so obtained are shown in Table I; see, Foam A. For purposes of comparision there are also shown the corresponding properties of foams (which do not fall within the scope of this invention) prepared from polyols known in the art using the same procedure as described above. These latter foams (labelled Foam B and Foam C) were prepared using the following proportions of ingredients.

Foam B:
   67 g. of a modified condensate of propylene oxide and the polyamine employed as starting material in Example 1;
   33 g. a propylene oxide-phosphoric acid adduct identical to that employed in Foam A;
   2 g. of DC–201
   2 g. of N,N,N',N'-tetramethyl-1,3-butanediamine
   1 g. of triethylamine
   37 g. of Freon 11–B and
   120 g. of PAPI®

Foam C:
   28 g. of G–560 DM (α-methyl glucoside-propylene oxide adduct)
   40 g. of G–435 DM (α-methyl glucoside-propylene oxide adduct)
   32 g. of propylene oxide-phosphoric acid adduct identical to that employed in Foam A;
   2 g. of DC–201
   2 g. of N,N,N',N'-tetramethyl-1,3-butanediamine
   1 g. of triethylamine
   37 g. of Freon 11–B and
   112 g. of PAPI®

TABLE I

| | Foam A | Foam B | Foam C |
|---|---|---|---|
| NCO/OH ratio in foam mix | 1.1 | 1.1 | 1.05 |
| Percent phosphorus in foam | 1.01 | 1.01 | 1.01 |
| Overall average functionality of polyol component | 4.75 | 4.28 | 3.68 |
| Density (lbs./cu. ft.)[1] | 1.92 | 1.85 | 1.91 |
| Compressive strength (p.s.i.) (// to rise).[1] | 26.7 | 21.1 | 26.4 |
| Percent vol. change at 100% relative humidity: [1] | | | |
| 158° F. for 14 days | +13 | +9.2 | +22 |
| 100° F. for 14 days | +1.97 | +1.50 | |
| Percent vol. change at 200° F. dry heat, 7 days.[1] | +3.3 | +2.3 | +6.1 |
| Flame test (ASTM 1692-59T): | | | |
| Distance burned | 1 3/16″ | 1 7/16″ | 1 5/8″ |
| Rating | Self extinguishing | Self-extinguishing | Self-extinguishing |
| Char characteristics | High struct. integrity in char. | Little char mostly melt-melted. | No char complete melt. |

[1] These tests carried out using the procedures defined in "Physical Test Procedures for Rigid Urethane Foam" published by Market Development Section, Atlas Chemical Industries, Inc., Wilmington, Del.

EXAMPLE 8

This illustrates the preparation of a fire retardant rigid polyurethane foam according to the invention.

A mixture of 71 g. of the polyamine-ethylene oxide-propylene oxide adduct prepared as described in Example 1, 29 g. of a propylene oxide-phosphoric acid (prepared in accordance with the procedure described in U.S. Patent 2,372,244), 2.0 g. of DC-201, 1 g. of N,N,N′,N′-tetramethyl-1,3-butanediamine and 1 g. of triethylamine was prepared using a mechanical blender. Freon 11-B (modified trichlorofluoromethane) was introduced into the mixture until an overall weight increase of 33 g. was attained. To the resulting mixture was added 96 g. (0.72 equiv.) of PAPI® with vigorous stirring, and the mixture so obtained was poured as quickly as possible into an open mold (7″ x 7″ x 12″) and allowed to rise freely. The resulting foam was cured at approximately 25° C. for 24 hrs. The physical properties of the foam so obtained are shown in Table II: see, Foam D. For purposes of comparison there are also shown the corresponding properties of a foam (which does not fall within the scope of this invention) prepared from a polyol prepared as follows:

A total of 412 g. (4 amine equivalents) of the mixture of polyamines employed as starting material (identical to starting material of Example 1) was reacted with stirring under nitrogen in the absence of catalyst with propylene oxide (465 g.; 8 moles) during about 10 hrs. in the range of 218° C. to 228° C. The reaction mixture was cooled overnight, still under a slight positive pressure of nitrogen gas. To this resulting mixture was added 0.52 g. of powdered potassium hydroxide and the mixture so obtained was reacted further, with stirring, with propylene oxide (348.5 g.; 6 moles) during about 10 hrs. in the range of 190° C. to 240° C. The resulting polyamine-propylene oxide adduct had an equivalent weight of 153 and a viscosity of 59,300 cps. at 50° C.

Using the polyol so obtained Foam E was prepared using the procedure described above for Foam D from the following ingredients:

70 g. of the polyamine-propylene oxide adduct prepared as described above
30 g. of the propylene oxide-phosphoric acid adduct employed in Foam D
2 g. of DC-201
1 g. of N,N,N′,N′-tetramethyl-1,3-butanediamine
33 g. of Freon 11-B
99 g. of PAPI®

TABLE II

| | Foam D | Foam E |
|---|---|---|
| NCO/OH ratio in foam mix | 1.10 | 1.10 |
| Percent phosphorus in foam | 0.996 | 1.00 |
| Overall average functionality of polyol components | 4.81 | 4.81 |
| Density (lbs./cu. ft.) [1] | 1.91 | 1.98 |
| Compressive strength (p.s.i.) [∥ to rise] [1] | 21.4 | 24.0 |
| Percent vol. change at 100% relative humidity: [1] | | |
| 158° F. for— | | |
| 24 hrs | +9.7 | +10.3 |
| 7 days | +18.1 | +16.2 |
| 14 days | +22.0 | +20.9 |
| 100° F. for— | | |
| 24 hrs | +0.78 | 0 |
| 7 days | +1.8 | +1.7 |
| 14 days | +3.5 | +2.3 |
| Percent vol. change at 200° F. dry heat: [1] | | |
| 3 days | +5.3 | +4.1 |
| 7 days | +8.6 | +5.7 |
| Flame Test (ASTM 1692-59T): | | |
| Distance burned | 1³⁄₁₆″ | 2¼″ |
| Rating | [2] | [3] |

[1] These tests carried out using the procedures defined in "Physical Test Procedures for Rigid Urethane Foams" published by Market Development Section, Atlas Chemical Industries, Inc., Wilmington, Del.
[2] Non-burning.
[3] Self-extinguishing.

EXAMPLE 9

Using the procedure described for the preparation of Foam A in Example 7, three foams were prepared from the following ingredients.

Foam F:
   75 g. of Carwinol 151 (modified alkylene oxide condensate of a polyamine: equivalent weight 130)
   25 g. of Fyrol 6 (diethyl N,N-di(2-hydroxyethyl) aminomethanephosphonate)
   1 g. of N,N,N′,N′-tetramethyl-1,4-butanediamine
   33 g. of Freon 11-B
   1.9 g. of L-5310 (silicone surfactant)
   117 g. of PAPI® [previously mixed with 2% by weight of an adduct (eq. wt.=89) of 3 moles of propylene oxide and 1 mole of glycerin]

Foam G:
   75 g. of the polyamine-ethylene oxide-propylene oxide adduct prepared as described in Example 1.
   25 g. of Fyrol 6
   1 g. of N,N,N′,N′-tetramethyl-1,4-butanediamine
   31 g. fo Freon 11-B
   1.70 g. of L-5310
   107 g. of PAPI® [previously mixed with 2% by weight of an adduct (eq. wt.=89) of 3 moles of propylene oxide and 1 mole of glycerin]

Foam H:
   56.2 g. of the polyamine-ethylene oxide-propylene oxide adduct prepared as described in Example 1.
   18.8 g. of an adduct (eq. wt.=89) of 3 moles of propylene oxide and 1 mole of glycerin
   25 g. of Fyrol 6
   1 g. of N,N,N′,N′-tetramethyl-1,4-butanediamine
   33 g. of Freon 11-B
   1.93 g. of L-5310
   121 g. of PAPI® [previously mixed with 2% by weight of an adduct (eq. wt.=89) of 3 moles of propylene oxie and 1 mole of glycerin]

The physical properties of the above 3 foams are summarized in Table III.

TABLE III

| | Foam F | Foam G | Foam H |
|---|---|---|---|
| NCO/OH ratio in foam mix | 1.07 | 1.07 | 1.07 |
| Polyol blend Eq. wt | 130.0 | 141.0 | 125.0 |
| Density (lbs./cu. ft.) [1] | 1.92 | 1.82 | 1.91 |
| Compressive strength (p.s.i.) (∥ to rise): [1] | 27.4 | 23.9 | 24.5 |
| Percent vol. change at 100% R.H.: [1] | | | |
| 158° F. for— | | | |
| 24 hrs | 4.7 | 6.0 | 5.8 |
| 3 days | 6.2 | 8.1 | 7.2 |
| 7 days | 8.0 | 10.5 | 9.1 |
| Percent vol. change at 200° F. (dry heat): [1] | | | |
| 3 days | 2.0 | 3.5 | 2.9 |
| 7 days | 3.0 | 5.2 | 4.2 |
| Flame test (ASTM 1692-59T): | | | |
| Furthest point burned | 1⅜″ | ⅞″ | 1³⁄₁₆″ |
| Average distance burned | 1⅛″ | ⅞″ | ¾″ |
| Classification | Self-extinguishing. | Non-burning. | Self-extinguishing. |
| Char characteristics | Melted | No melt | No melt. |

[1] These tests carried out using the procedures defined in "Physical Test Procedures for Rigid Urethane Foams" published by Market Development Section, Atlas Chemical Industries Inc., Wilmington, Del.

We claim:
1. A polyol comprising the adduct obtained by reacting an amine selected from the class consisting of methylenedianiline and polyamine mixtures obtained by acid condensation of aniline and formaldehyde sequentially firstly with ethylene oxide and secondly with a vicinal alkylene oxide of from 3 to 9 carbon atoms, the residues of said ethylene oxide and said vicinal alkylene oxide being present in the adduct in amount corresponding to at least 2 molecular equivalents of each oxide for each amine equivalent of said amine.

2. A polyol according to claim 1 wherein the vicinal alkylene oxide is propylene oxide.

3. A polyol comprising the adduct obtained by reacting one amine equivalent of a polyamine mixture obtained by acid condensation of aniline and formaldehyde, 100 parts of said polyamine mixture containing 35 to 90 parts of methylenedianilines, the remaining parts being triamines and polyamines of higher molecular weight, sequentially firstly with from 2 to 20 molar equivalents of ethylene oxide and secondly with from 2 to 20 molar equivalents of a vicinal alkylene oxide of from 3 to 9 carbon atoms.

4. A polyol according to claim 3 wherein the vicinal alkylene oxide is propylene oxide.

5. A polyol comprising the adduct obtained by reacting one amine equivalent of a polyamine mixture obtained by acid condensation of aniline and formaldehyde, 100 parts of said polyamine mixture containing 35 to 90 parts of methylenedianilines, the remaining parts being triamines and polyamines of higher molecular weight, sequentially firstly with about 2 molar equivalents of ethylene oxide and secondly with about 2 molar equivalents of a vicinal alkylene oxide of from 3 to 9 carbon atoms.

6. A polyol according to claim 5 wherein the vicinal alkylene oxide is propylene oxide.

7. A polyol according to claim 5 wherein the polyamine mixture contains approximately 50 parts of methylenedianilines per 100 parts of mixture.

8. A polyol having the formula:

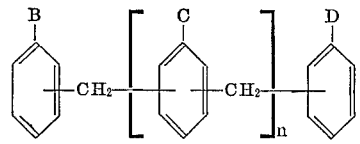

wherein B, C, and D represent:

$$-N-[(CH_2CH_2O)_x-(A-O)_y-H]_2$$
$$-N-[(CH_2CH_2O)_{x'}-(A-O)_{y'}-H]_2$$
$$-N-[(CH_2CH_2O)_{x''}-(A-O)_{y''}-H]_2$$

respectively, wherein A is the alkylene residue of a vicinal alkylene oxide of from 3 to 9 carbon atoms, $n$ is an integer from 0 to 4, inclusive, and $x$, $y$, $x'$, $y'$, $x''$, and $y''$ are each integers from 1 to 10 inclusive.

References Cited
UNITED STATES PATENTS

| | | | |
|---|---|---|---|
| 3,152,188 | 10/1964 | Kirkpatrick et al. | 260—570.6 X |
| 3,159,591 | 12/1964 | Lanham. | |
| 3,152,188 | 10/1964 | Kirkpatrick et al. | 260—570.6 X |
| 3,159,591 | 12/1964 | Lanham | 260—2.5 |

FOREIGN PATENTS 910,333  11/1962  Great Britain.

ROBERT V. HINES, Primary Examiner

U.S. Cl. X.R.

260—2.5, 75, 77.5, 453, 465, 584